US011791621B2

(12) United States Patent
Vanevenhoven et al.

(10) Patent No.: US 11,791,621 B2
(45) Date of Patent: Oct. 17, 2023

(54) ECONOMIZER FAILURE DETECTION AND BIT METHOD CIRCUITS

(71) Applicant: Hamilton Sundstrand Corporation, Charlotte, NC (US)

(72) Inventors: Jordan K. Vanevenhoven, Rockford, IL (US); Thomas P. Joyce, Rockford, IL (US); Natalie Filipski, Saint Charles, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 423 days.

(21) Appl. No.: 16/821,385

(22) Filed: Mar. 17, 2020

(65) Prior Publication Data

US 2021/0296885 A1 Sep. 23, 2021

(51) Int. Cl.
  *H02H 9/02* (2006.01)
  *H02H 3/08* (2006.01)
  *H02H 7/22* (2006.01)
  *H01H 47/22* (2006.01)
  *H02H 1/00* (2006.01)

(52) U.S. Cl.
  CPC .............. *H02H 7/22* (2013.01); *H01H 47/22* (2013.01); *H02H 1/0007* (2013.01)

(58) Field of Classification Search
  CPC .......... H02H 7/22; H02H 7/01; H02H 7/0007; H01H 47/22
  USPC ....................................................... 361/93.1
  See application file for complete search history.

(56) References Cited

U.S. PATENT DOCUMENTS

| 3,590,334 | A |   | 6/1971  | Baker |
|-----------|---|---|---------|-------|
| 3,594,615 | A |   | 7/1971  | Cortelli |
| 4,979,069 | A | * | 12/1990 | Simpson .................. H02H 7/08 361/173 |
| 5,539,608 | A |   | 7/1996  | Hurley et al. |
| 8,810,991 | B2 |  | 8/2014  | Scharnick |
| 8,836,338 | B2 |  | 9/2014  | Tyler et al. |
| 9,056,551 | B2 |  | 6/2015  | Mirzaei |
| 9,476,931 | B2 |  | 10/2016 | Sun et al. |
| 9,589,753 | B2 |  | 3/2017  | Lunden et al. |
| 9,746,512 | B2 |  | 8/2017  | Shipley |
| 9,774,181 | B2 |  | 9/2017  | Bonasia et al. |
| 10,106,042 | B2 | | 10/2018 | Mifsud et al. |
| 10,114,057 | B2 | | 10/2018 | Beierschmitt et al. |

(Continued)

FOREIGN PATENT DOCUMENTS

WO    WO 2005/008858    *    1/2005

OTHER PUBLICATIONS

Extended European Search Report dated Aug. 25, 2021, issued during the prosecution of European Patent Application No. EP 21161881.4.

*Primary Examiner* — Jared Fureman
*Assistant Examiner* — Lucy M Thomas
(74) *Attorney, Agent, or Firm* — Locke Lord LLP; Joshua L. Jones; Scott D. Wofsy

(57) ABSTRACT

A method includes detecting a failure in a contactor economizer that is configured to provide a first current to a coil of a contactor to close the contactor, and to provide a second current lower than the first current to the coil after the contactor is closed to hold the contactor closed. The method includes at least one of: driving contactor actuation based on economizer failure status; and/or signaling failure of the economizer through built in test (BIT) indication.

3 Claims, 2 Drawing Sheets

(56) References Cited

U.S. PATENT DOCUMENTS

| | | |
|---|---|---|
| 10,352,984 B2 | 7/2019 | Thomas et al. |
| 10,422,826 B2 | 9/2019 | Handy |
| 10,431,972 B2 | 10/2019 | Epee |
| 2005/0024102 A1* | 2/2005 | Kondo ................ H01H 47/002 327/110 |
| 2007/0146959 A1 | 6/2007 | Morita |
| 2013/0083444 A1 | 4/2013 | Barnes et al. |
| 2014/0133109 A1 | 5/2014 | Thomasson et al. |
| 2017/0092449 A1 | 3/2017 | Thornton et al. |
| 2018/0102229 A1 | 4/2018 | Oppermann et al. |

* cited by examiner

ECONOMIZER FAILURE DETECTION AND BIT METHOD CIRCUITS

BACKGROUND

1. Field

The present disclosure relates to power distribution systems, and more particularly to economizers for electrical power generation and distribution system (EPGDS) contactors such as used in aerospace applications.

2. Description of Related Art

Electrical power generation and distribution system (EPGDS) contactors often have built-in economizers which switch from a high current "pull-in" mode, to a lower current "hold" mode, for reduced power dissipation in the contactor coil and coil drive. The failure of the economizer can either cause the coil drive circuitry to trip on overcurrent and inadvertently de-energize the contactor, or may not be detectible if the pull-in current is below the overcurrent threshold.

The conventional techniques have been considered satisfactory for their intended purpose. However, there is an ever present need for improved systems and methods for economizers for EPGS contactors. This disclosure provides a solution for this need.

SUMMARY

A system includes a contactor driver circuit having an overcurrent status monitor. Logic is connected to the overcurrent status monitor to perform at least one of: drive contactor actuation based on economizer failure status; and/or signal failure of the economizer.

The contactor driver circuit can include a coil driver close command line, and the logic can include an economizer failure status coil driver command line that is OR'ed with the coil driver close command line. The economizer failure status line can be operatively connected to the overcurrent status monitor. The overcurrent status monitor can connect directly to a built in test (BIT) and/or diagnostics system. The coil driver close command line can be connected to a falling edge delay circuit configured to delay after a contactor command is removed to keep the contactor drive circuit active for a predetermined amount of time in an event that an economizer failure is detected.

The falling edge delay circuit can be connected to an AND logic gate together with an enable line configured to enable or disable the logic, and with an overcurrent status monitor output configured to detect economizer failures, wherein the AND logic gate has an output that is OR'ed with the driver command line. A contactor can include a contact operatively connected to a coil with economizer for actuating the contactor to open and close a circuit, wherein the coil driver circuit is operatively connected to the coil of the contactor to provide a first current to the coil to close the contactor, and to provide a second current lower than the first current to the coil after the contactor is closed to hold the contactor closed.

A method includes detecting a failure in a contactor economizer that is configured to provide a first current to a coil of a contactor to close the contactor, and to provide a second current lower than the first current to the coil after the contactor is closed to hold the contactor closed. The method includes at least one of: driving contactor actuation based on economizer failure status; and/or signaling failure of the economizer through BIT indication.

Output from detecting failure in the contactor economizer can be OR'ed with output from monitoring externally for driving contactor actuation and/or signaling failure of the economizer. The method can include monitoring externally for built in testing (BIT) status. The method can include keeping the contactor drive active for a delay period after economizer failure is detected. The method can include communicating economizer failure to an external economizer monitor. It is also contemplated that the method can include monitoring status of a contactor driven by the contactor drive using a line replaceable unit (LRU) external of the contactor drive to determine if an economizer has failed. The LRU can be an SPDA, emergency power controller, integrated modular avionics (IMA), bus power controller, or any other suitable type of LRU. The method can include keeping the contactor drive active for a delay period after a contactor driver LRU failure is detected. It is also contemplated that the method can include monitoring the status of a contactor driven by the contactor drive using a line replaceable unit (LRU) external of the contactor drive to determine if a contactor driver LRU has failed.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
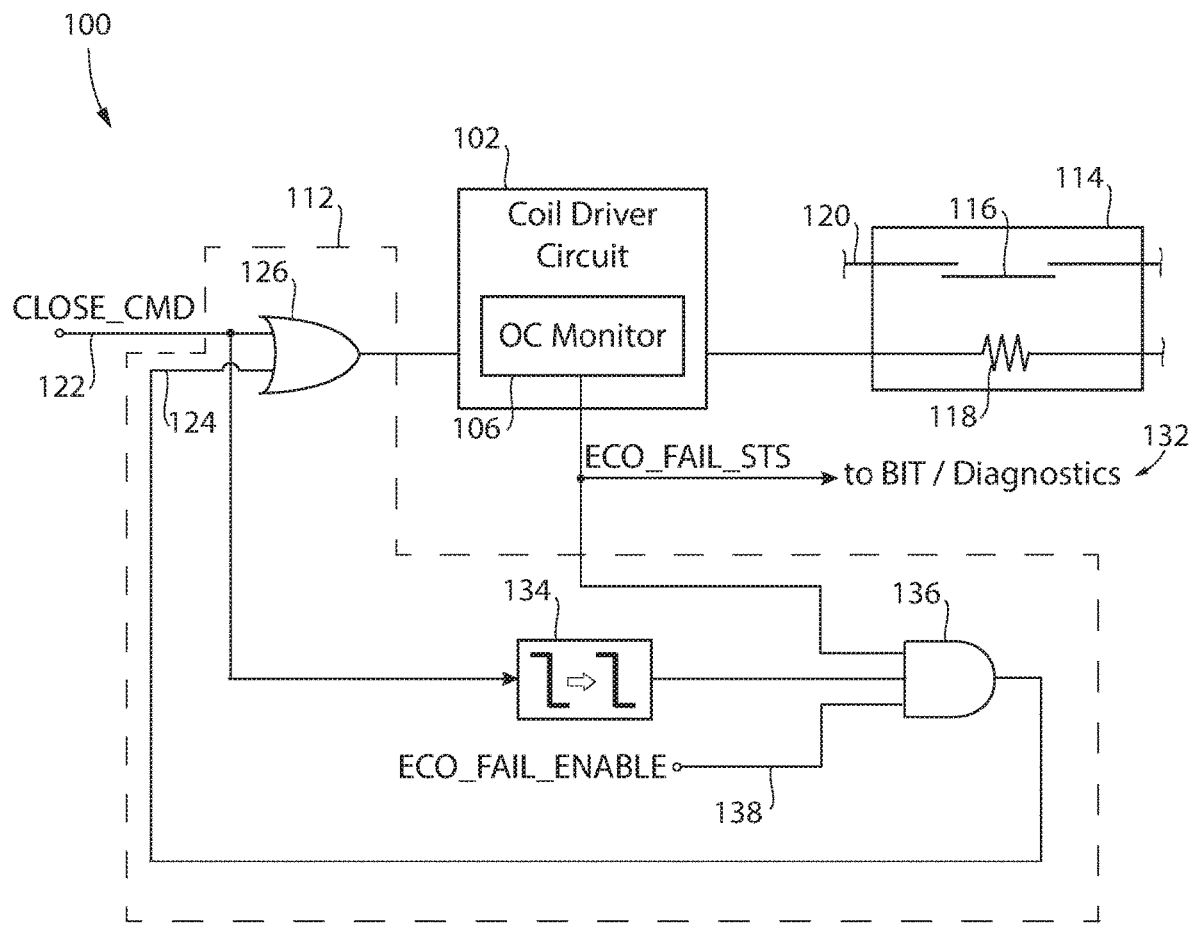
FIG. 1 is a schematic view of an embodiment of a system constructed in accordance with the present disclosure, showing the economizer and contactor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to prevent tripping a contactor in response to a contactor driver failure in circumstances where it is desirable to leave the contactor closed as long as it is able (e.g. for a backup or emergency generator in an emergency condition). Even without the protective function, it can be desirable to use systems and methods as disclosed herein to expose the economizer failure that may cause premature failure of the contactor in a subsequent emergency condition.

The system 100 includes a contactor coil driver circuit 102 including an overcurrent status monitor 106 to determine the failure status of the economizer of the contactor 114. Logic 112 is connected to the overcurrent status monitor 106 to drive contactor actuation based on economizer failure status, and/or signal failure of the economizer of the contactor 114, e.g. to prevent future contactor failure from undetected economizer failure.

A contactor 114 includes a contact 116 operatively connected to a coil with economizer 118 for actuating the contactor 114 to open and close a circuit 120, e.g., connecting a ram air turbine (RAT) or other power supply to a power distribution system. The contactor coil driver circuit 102 is operatively connected to the coil with economizer 118 of the contactor 114 to provide a voltage source to the contactor 114. The coil economizer 118 operates such that there is first current to the coil 118 during a pull-in phase to close the contactor 114. The economizer of the coil 118 is also configured to provide a second current lower than the first current to the coil 118 during a hold phase after the contactor 114 is closed to hold the contactor 114 closed.

The contactor coil driver circuit 102 is connected to a coil driver close command line 122. The logic 112 includes an economizer failure status coil drive command line 124 that is OR'ed at an OR gate 126 with the coil driver close command line 122. The output of the OR gate 126 is connected to ultimately control the contactor coil driver circuit 102 and contactor 114. The overcurrent status monitor 106 of the contactor coil driver circuit 102 can connect directly to a built in test (BIT) and/or diagnostics system 132, which can be onboard the contact driver circuit 102, or external. The coil driver close command line 122 is connected to a falling edge delay circuit 134 configured to delay after a contactor command is removed. The falling edge delay circuit 134 is connected to an AND logic gate 136 together with an enable line 138 and overcurrent status monitor 106 output, wherein the AND logic gate 136 has an output (economizer failure coil drive command line 124) that is OR'ed with the coil driver close command line 122 to keep the contactor drive circuit 102 active for a predetermined amount of time after the close command has been removed when an economizer failure has been detected. The enable line 138 can be used to enable or disable the logic 112.

Figure 2:
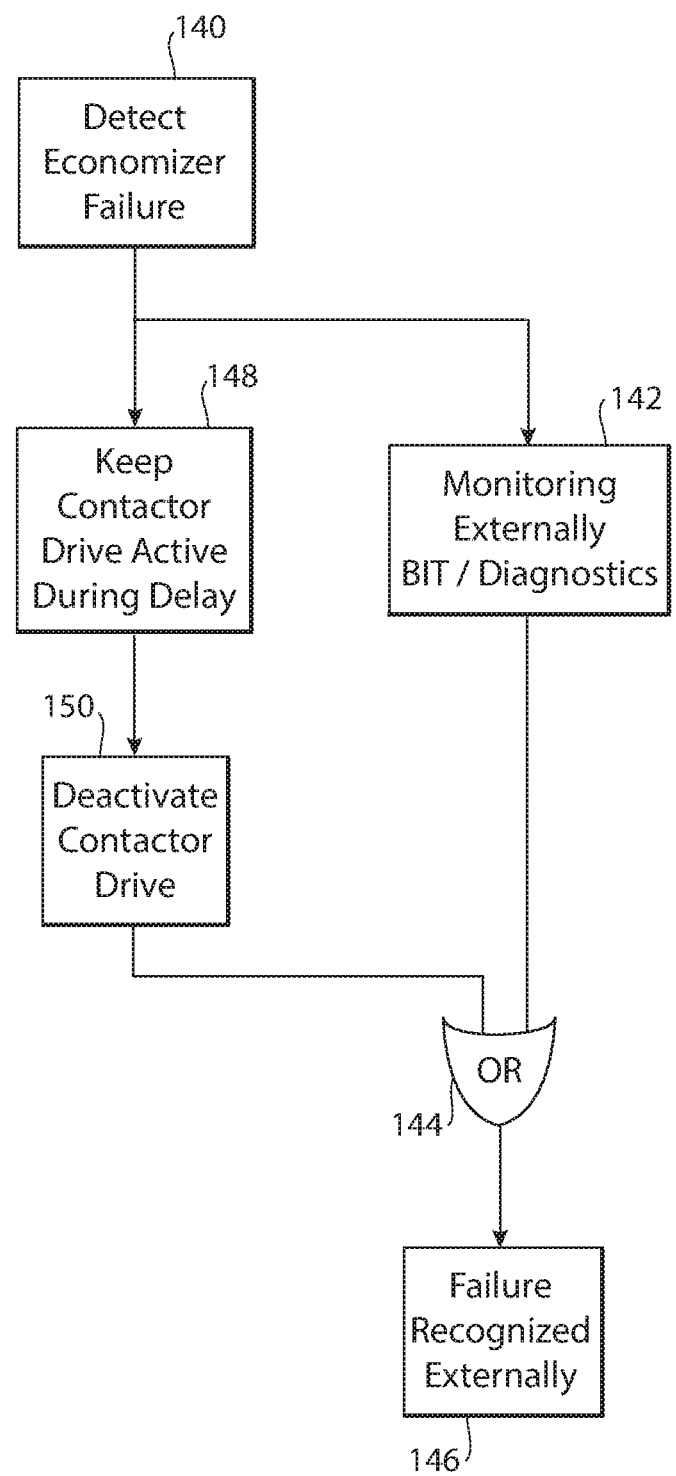
FIG. 2 is a schematic view of a method in accordance with the present disclosure.

With reference now to FIG. 2, a method includes detecting a failure, as indicated by box 140 in a contactor drive system (e.g., contactor drive circuit 102 and contactor 114) having an economizer as described above. The method includes at least one of: driving contactor actuation based on economizer failure status as indicated in box 148 after the command would otherwise be removed; and de-activating the contactor drive after a pre-determined amount of time, as indicated in box 150. This allows an external monitor which was expecting the contactor to open during a specific timing to determine there was a failure.

The method can include monitoring for diagnostics and/or built in testing (BIT) of the economizer and indicating via communications if available (either a dedicated BIT status discrete or communications protocol) as indicated in box 142. The failure can then be recognized externally either via this indication if available or via a method that monitors for delayed contactor opening monitoring as indicated in FIG. 2 with boxes 144, 146. The method can include keeping the contactor drive active for a delay period after economizer failure is detected, as indicated in box 148. The method can include communicating economizer failure to an external monitor, as indicated in box 146. The method can include monitoring line status of a contactor driven by the contactor drive using a line replaceable unit (LRU) external of the contactor drive, as indicated in box 146. The LRU can for example be a secondary power distribution assembly (SPDA), Integrated Modular Avionics (IMA), an emergency power controller, and/or any other suitable type of LRU.

The methods and systems of the present disclosure, as described above and shown in the drawings, provide for the ability to prevent tripping a contactor in response to a contactor driver failure in circumstances where it is desirable to leave the contactor closed as long as it is able (e.g. for a backup or emergency generator in an emergency condition). These methods and systems of the present disclosure also make the failure evident in applications with limited communications capability or inputs/outputs. Even without the protective function, it can be desirable to use systems and methods as disclosed herein to expose the economizer failure that may cause premature failure of the contactor in a subsequent emergency condition. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a contactor driver circuit having an overcurrent status monitor; and
   logic connected to the overcurrent status monitor to perform at least one of:
   driving a contactor based on economizer failure status of an economizer of the contactor; and/or
   signaling a failure of the economizer;
   wherein the contactor driver circuit includes a coil driver close command line, and wherein the logic includes an economizer failure status coil driver command line that is OR'ed with the coil driver close command line, wherein the economizer failure status line is operatively connected to the overcurrent status monitor, wherein the coil driver close command line is connected to a falling edge delay circuit configured to delay after a contactor command is removed to keep the contactor drive circuit active for a predetermined amount of time in an event that an economizer failure is detected, wherein the falling edge delay circuit is connected directly as an input to an AND logic gate, wherein an enable line configured to enable or disable the logic is connected directly as an input to the AND logic gate, and wherein an overcurrent status monitor output configured to detect economizer failures is connected directly as an input to the AND logic gate, wherein the AND logic gate has an output that is OR'ed with a driver command line.

2. The system as recited in claim 1, wherein the overcurrent status monitor connects directly to a built in test (BIT) and/or diagnostics system.

3. The system as recited in claim 1, further comprising:
   a contactor including a contact operatively connected to a coil with economizer for actuating the contactor to open and close a circuit, wherein the coil driver circuit is operatively connected to the coil of the contactor to provide a first current to the coil to close the contactor, and to provide a second current lower than the first current to the coil after the contactor is closed to hold the contactor closed.

* * * * *